US011761349B2

United States Patent
Colson et al.

(10) Patent No.: US 11,761,349 B2
(45) Date of Patent: Sep. 19, 2023

(54) BEARING HOUSING FOR A TWO-WHEEL AIR CYCLE MACHINE

(71) Applicant: Hamilton Sundstrand Corporation, Charlotte, NC (US)

(72) Inventors: Darryl A. Colson, West Suffield, CT (US); Eric Chrabascz, Longmeadow, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 93 days.

(21) Appl. No.: 17/218,564

(22) Filed: Mar. 31, 2021

(65) Prior Publication Data

US 2021/0310498 A1    Oct. 7, 2021

Related U.S. Application Data

(60) Provisional application No. 63/004,833, filed on Apr. 3, 2020.

(51) Int. Cl.
  *F01D 25/16*    (2006.01)
  *F01D 25/24*    (2006.01)
  (Continued)

(52) U.S. Cl.
  CPC .......... *F01D 25/162* (2013.01); *F01D 25/24* (2013.01); *F02C 6/06* (2013.01); *F04D 29/424* (2013.01);
  (Continued)

(58) Field of Classification Search
  CPC .......... F01D 25/162; F01D 25/24; F02C 6/06; F16C 35/02; F16C 2360/24; F05D 2220/40; F05D 2240/50; B64D 13/06
  See application file for complete search history.

(56) References Cited

U.S. PATENT DOCUMENTS

| 5,214,935 | A | | 6/1993 | Brunskill |
| 5,791,868 | A | * | 8/1998 | Bosley ............... F16C 17/042 |
| | | | | 417/365 |

(Continued)

FOREIGN PATENT DOCUMENTS

| EP | 3539876 A1 | 9/2019 |
| EP | 3705730 A1 | 9/2020 |
| WO | 9914510 A1 | 3/1999 |

OTHER PUBLICATIONS

Extended European Search Report for European Patent Application No. 21166191.3, dated May 21, 2021, 9 pages.

(Continued)

*Primary Examiner* — Eldon T Brockman
(74) *Attorney, Agent, or Firm* — Kinney & Lange, P.A.

(57) ABSTRACT

A bearing housing for a two-wheel air cycle machine includes a first housing portion, a second housing portion, a third housing portion, and a journal bearing bore. The first housing portion is centered around an axis and has a first side and a second side. The second side is positioned axially away from the first side. The second housing portion is centered around the axis and has a first side and a second side. The second side is positioned axially away from the first side. The first side of the second housing portion connects to the second side of the first housing portion. The third housing portion is centered around the axis and has a first side and a second side. The second side is positioned axially away from the first side. The first side of the third housing portion connects to the second side of the second housing portion. The journal bearing bore is centered axially with in the bearing housing and has a diameter of $D_1$.

20 Claims, 5 Drawing Sheets

(51) Int. Cl.
*F04D 29/42* (2006.01)
*F16C 35/02* (2006.01)
*F02C 6/06* (2006.01)
*F16C 17/02* (2006.01)
*F16C 37/00* (2006.01)

(52) U.S. Cl.
CPC ............ *F16C 17/024* (2013.01); *F16C 35/02* (2013.01); *F16C 37/00* (2013.01); F05D 2220/50 (2013.01); F05D 2240/52 (2013.01); F05D 2240/54 (2013.01)

(56) References Cited

U.S. PATENT DOCUMENTS

| | | |
|---|---|---|
| 8,747,066 B2 | 6/2014 | Strom et al. |
| 8,887,486 B2 | 11/2014 | Rosen et al. |
| 9,393,652 B2 | 7/2016 | Colson et al. |
| 9,470,234 B2 | 10/2016 | Rosen et al. |
| 9,556,885 B2 | 1/2017 | Beers et al. |
| 9,745,858 B2 | 8/2017 | Beers et al. |
| 9,784,126 B2 | 10/2017 | Army et al. |
| 9,803,493 B2 | 10/2017 | Svihla et al. |
| 9,897,093 B2 | 2/2018 | Army, Jr. et al. |
| 10,160,546 B2 | 12/2018 | Beers et al. |
| 10,215,224 B1 * | 2/2019 | Lee .................... F16C 33/1015 |
| 10,400,628 B2 | 9/2019 | Beers et al. |
| 2006/0083609 A1 | 4/2006 | Augspurger |
| 2009/0274548 A1 | 11/2009 | Joco et al. |
| 2012/0156065 A1 | 6/2012 | Colson et al. |
| 2013/0078090 A1 * | 3/2013 | Beers ..................... F01D 25/16 415/230 |
| 2014/0056718 A1 | 2/2014 | Beers et al. |
| 2015/0233386 A1 | 8/2015 | Beers et al. |
| 2015/0345334 A1 | 12/2015 | Scott |
| 2018/0340571 A1 | 11/2018 | Ayyagari |
| 2019/0285087 A1 | 9/2019 | Colson et al. |
| 2019/0285119 A1 * | 9/2019 | Colson ................. F04D 29/056 |

OTHER PUBLICATIONS

Extended European Search Report for European Patent Application No. 21166344.8, dated Sep. 1, 2021, 11 pages.

* cited by examiner

BEARING HOUSING FOR A TWO-WHEEL AIR CYCLE MACHINE

CROSS-REFERENCE TO RELATED APPLICATION(S)

This application claims priority to U.S. Provisional Application No. 63/004,833, filed on Apr. 3, 2020, and entitled "Bearing Housing for a Two-Wheel Air Cycle Machine," the disclosure of which is incorporated by reference in its entirety.

BACKGROUND

The present disclosure relates to air cycle machines. Specifically, the present disclosure relates to a bearing housing for an aircraft air cycle machine.

Aircraft environmental control systems use air cycle machines (ACM) to condition air to an appropriate pressure, temperature, and humidity for pilots to use in aircraft operational systems and for electronics cooling. An ACM may include a compressor rotor and a turbine rotor mechanically coupled by a tie rod. Air enters the system from a bleed source, such as the aircraft engines, and is compressed by the compressor rotor. The compressed air is then ducted to other portions of the system such as a heat exchanger and a reheater. The compressed air is then expanded through the turbine rotor and exits for use in aircraft systems. As air expands through and turns the turbine rotor, the tie rod transfers the motion to turn the compressor rotor. The tie rod is typically supported by journal bearings and thrust bearings. ACMs need components that securely support the bearings during operational conditions with increased pressure and temperatures.

SUMMARY

A bearing housing for a two-wheel air cycle machine includes a first housing portion, a second housing portion, a third housing portion, and a journal bearing bore. The first housing portion is centered around an axis and has a first side and a second side. The second side is positioned axially away from the first side. The second housing portion is centered around the axis and has a first side and a second side. The second side is positioned axially away from the first side. The first side of the second housing portion connects to the second side of the first housing portion. The third housing portion is centered around the axis and has a first side and a second side. The second side is positioned axially away from the first side. The first side of the third housing portion connects to the second side of the second housing portion. The journal bearing bore is centered axially with in the bearing housing and has a diameter of $D_1$.

A two-wheel air cycle machine for an aircraft includes a turbine assembly, a compressor assembly, a tie rod, and thrust bearings. The turbine assembly includes a turbine rotor, a turbine housing, and a turbine-end journal bearing within the turbine housing. The compressor assembly includes a compressor inlet housing, a compressor outlet housing, a compressor seal housing, a bearing housing, and a compressor-end journal bearing within the bearing housing. The compressor outlet housing is connected to the compressor inlet housing. The compressor seal housing is within the compressor outlet housing. The bearing housing is within the compressor outlet housing and attached at a first end to the compressor seal housing and at a second end to the turbine housing. The bearing housing includes a first housing portion, a second housing portion, a third housing portion, and a journal bearing bore. The first housing portion is centered around an axis and has a first side and a second side. The second side is positioned axially away from the first side. The second housing portion is centered around the axis and has a first side and a second side. The second side is positioned axially away from the first side. The first side of the second housing portion connects to the second side of the first housing portion. The third housing portion is centered around the axis and has a first side and a second side. The second side is positioned axially away from the first side. The first side of the third housing portion connects to the second side of the second housing portion. The journal bearing bore is centered axially with in the bearing housing and has a diameter of $D_1$. The tie rod is coaxial with the center axis and connects the turbine rotor and the compressor rotor. The tie rod is supported by the turbine-end journal bearing and the compressor-end journal bearing. The thrust bearings are centrally positioned between the turbine assembly and the compressor assembly and are supported by the turbine housing and the bearing housing.

DETAILED DESCRIPTION

Figure 1:
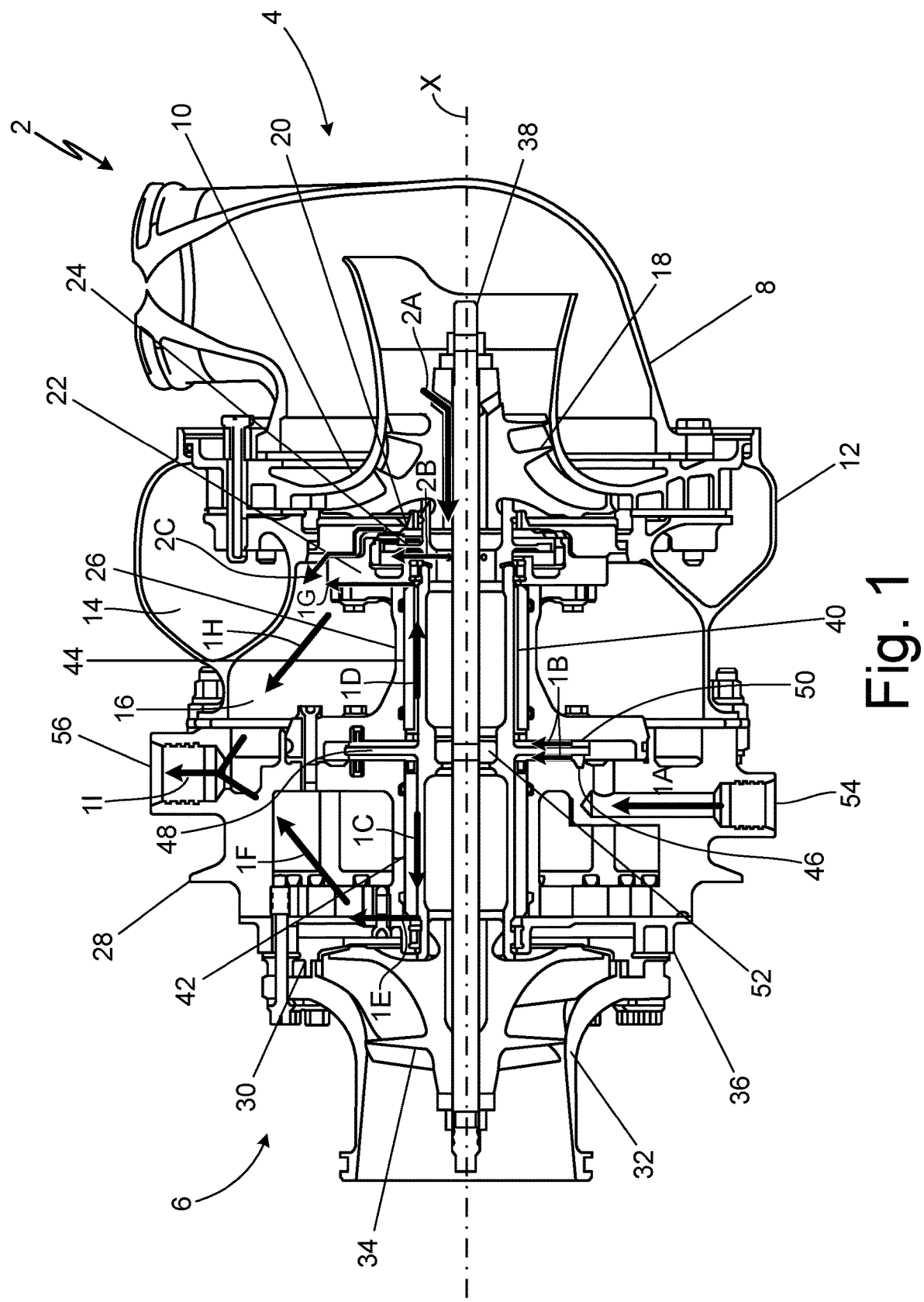
FIG. 1 is a cut away cross section of a two-wheel air cycle machine for an aircraft showing a bearing cooling flow path and a compressor rotor thrust balancing flow path.

FIG. 1 is a cut-away view of two-wheel air cycle machine 2 showing a bearing cooling flow path and a compressor rotor balancing flow path. Two-wheel air cycle machine 2 includes compressor assembly 4 and turbine assembly 6. Compressor assembly 4 includes compressor inlet housing 8, compressor shroud 10, and compressor outlet housing 12 with outlet conduit 14 and cavity 16. Compressor assembly 4 also includes compressor rotor 18, compressor seal plate 20, seal housing 22, and seal shaft 24. Compressor assembly 4 also includes bearing housing 26. Turbine assembly 6 includes turbine housing 28, turbine nozzle 30, turbine shroud 32, and turbine rotor 34, and seal plate 36. Two-wheel air cycle machine 2 further includes tie rod 38, air bearing shaft 40, turbine-side journal bearing 42, compressor-side journal bearing 44, turbine-side thrust bearing 46, thrust disk 48, compressor-side thrust bearing 50, and tie rod support 52. Turbine housing 28 includes bearing cooling inlet 54 and bearing cooling outlet 56. FIG. 1 also shows central axis x, arrow 1A to arrow 1I, and arrow 2A to arrow 2C.

Two-wheel air cycle machine 2 has compressor assembly 4 attached to turbine assembly 6. Compressor assembly 4 has compressor inlet housing 8 attached to and surrounding compressor shroud 10. Compressor inlet housing 8 and compressor shroud 10 are also attached to compressor outlet housing 12. Within compressor outlet housing 12 are compressor outlet 14 and cavity 16. Outlet conduit 14 is fluidly connected with compressor shroud 10. Compressor rotor 18 is within compressor shroud 10. Compressor seal plate 20 is attached between compressor outlet housing 12 and compressor shroud 10. Seal housing 22 is within compressor outlet housing 12 and attached to compressor seal plate 20. Seal housing 22 is fluidly connected to compressor inlet housing 8 through a central channel in compressor rotor 18. Seal shaft 24 is inside seal housing 22. Bearing housing 26 is within compressor outlet housing 12, surrounded by cavity 16, and attached at a first side to seal housing 22 and at a second side to turbine housing 28 of turbine assembly 6. Compressor outlet housing 12 is also attached to turbine housing 28. Turbine assembly 6 further includes turbine nozzle 30 within turbine shroud 32. Turbine shroud 32 is bolted to turbine housing 28 opposite bearing housing 26. Turbine rotor 34 is within turbine shroud 32. Turbine seal plate 36 is bolted between turbine housing 28 and turbine shroud 32.

Tie rod 38 runs through two-wheel air cycle machine 2 and is coaxial with central axis x. Tie rod 38 mechanically connects compressor rotor 18 to turbine rotor 34. Surrounding tie rod 38 is air bearing shaft 40 that is attached to and centrally located within compressor seal plate 20, seal housing 22, bearing housing 26, turbine housing 28, and turbine seal plate 36. Surrounding tie rod 38 between air bearing shaft 40 and turbine housing 28 is turbine-side journal bearing 42. Similarly, surrounding tie rod 38 between bearing housing 26 and air bearing shaft 40 is compressor-side journal bearing 44. Between turbine housing 28 and bearing housing 26 is turbine-side thrust bearing 46, thrust disk 48, and compressor-side thrust bearing 50 with thrust disk 48 located between turbine-side thrust bearing 46 and compressor-side thrust bearing 50. Turbine-side thrust bearing 46, thrust disk 48, and compressor-side thrust bearing 50 are perpendicular to axis x. Located near the center of and around tie rod 38 and within air bearing shaft 40 is tie rod support 52. Bearing cooling inlet 54 and bearing cooling outlet 56 are inlet and outlet ports, respectively, located on a radially outer surface of turbine housing 28. Bearing cooling inlet 54 is opposite bearing cooling outlet 56.

Two-wheel air cycle machine 2 is part of an air conditioning system of an aircraft. Air enters compressor assembly 4 of two-wheel air cycle machine 2 through compressor inlet housing 8. This air is from a bleed source elsewhere in the aircraft, such as the engines. Inlet housing 8 leads to compressor rotor 18 where air is compressed adding pressure, heat, and work. Air is then directed by compressor shroud 10 into outlet conduit 14 in compressor outlet housing 12. Air then flows away from two-wheel air cycle machine 2 through a duct (not shown) attached to outlet housing 12. Air then returns to two-wheel air cycle machine 2 after being cooled and dehumidified and enters through turbine nozzle 30. Air is forced through turbine rotor 34 to a lower pressure usable elsewhere in the aircraft for pilot systems and electronics cooling. Air exits two-wheel air cycle machine 2 through turbine shroud 32. When air passes through turbine rotor 34, the lost work from the decrease in pressure turns tie rod 38, transferring the lost work to compressor rotor 18. Tie rod 38 is supported by and rotates within air bearing shaft 40, turbine-side journal bearing 42, and compressor-side journal bearing 44. Turbine-side thrust bearing 46 and compressor-side thrust bearing 50 support axial loading on tie rod 38 from compressor rotor 18 and turbine rotor 34. Turbine-side journal bearing 42, compressor-side journal bearing 44, turbine-side thrust bearing 46, and compressor-side thrust bearing 50 are hydrodynamic thin foil bearings. Thrust disk 48, turbine housing 28, and bearing housing 26 hold turbine-side thrust bearing 46 and compressor-side thrust bearing 50 in place. Tie rod 38 is also supported near the center by tie-rod support 52. Turbine housing 28 and bearing housing 26 support turbine-side journal bearing 42 and compressor-side journal bearing 44, respectively.

Two-wheel air cycle machine 2 includes a bearing cooling flow path. Cooling air enters turbine housing 28 through bearing cooling inlet 54, shown by arrow 1A. The cooling flow then moves through turbine-side thrust bearing 46 and compressor-side thrust bearing 50, shown by arrows 1B. The cooling flow then splits, with a first portion, shown by arrow 1C going through turbine-side journal bearing 42 and a second portion, shown by arrow 1D, going through compressor-side journal bearing 44. The first portion then travels between turbine seal plate 36 and turbine housing 28, shown by arrow 1E, and into an inner portion of turbine housing 28, shown by arrow 1F. The second portion passes between seal housing 22 and bearing housing 26, shown by arrow 1G, and into cavity 16 and around an outer surface of bearing housing 26, shown by arrow 1H. The first portion and the second portion then converge and exit turbine housing 28 through bearing cooling outlet 56, shown by arrow 1I.

Two-wheel air cycle machine also includes a compressor rotor thrust balancing flow. The compressor rotor thrust balancing flow enters compressor inlet housing 8 and moves through a center passage in compressor rotor 18, shown by arrow 2A. The compressor rotor balancing flow then fills a space in seal housing 22 behind seal shaft 24, shown by arrow 2B. Air can leak from the seal housing 22 into cavity 16, shown by arrow 2C, and mix with the bearing cooling flow, shown by arrow 1H. The compressor rotor thrust balancing flow then exits through bearing cooling outlet 56 with the bearing cooling flow, shown by arrow 1I.

Configuring two-wheel air cycle machine 2 with a tie rod between compressor rotor 18 and turbine rotor 34 allows for work lost from the pressurized air moving through turbine assembly 6 to transfer to the air moving through compressor assembly 4. Turbine housing 28 supports tie rod 34 and holds turbine-side journal bearing 44 and turbine-side thrust bearing 46 in place. Bearing housing 26 supports tie rod 34 and holds compressor-side journal bearing 44 and compressor-side thrust bearing 50 in place. The location of turbine-side thrust bearing 46 and compressor-side thrust bearing 50 in the center of two-wheel air cycle machine 2 allows room to include thrust disk 48. Turbine housing 28 creates the bearing cooling flow path with bearing cooling inlet 54 and bearing cooling outlet 56. An exterior surface of bearing housing 26 defines the bearing cooling flow path within compressor outlet housing 12. Bearing cooling outlet 56 also acts as an outlet for the compressor rotor thrust balancing flow. Two-wheel air cycle machine 2 requires a low start up pressure due to seal housing 22, seal plate 20, and the compressor rotor thrust balancing flow path. The compressor rotor thrust balancing flow path balances the compressor rotor 18 on startup and during operation of air cycle machine 2 by pressurizing seal shaft 24 in seal housing 22 behind compressor rotor 18.

Figure 2A:
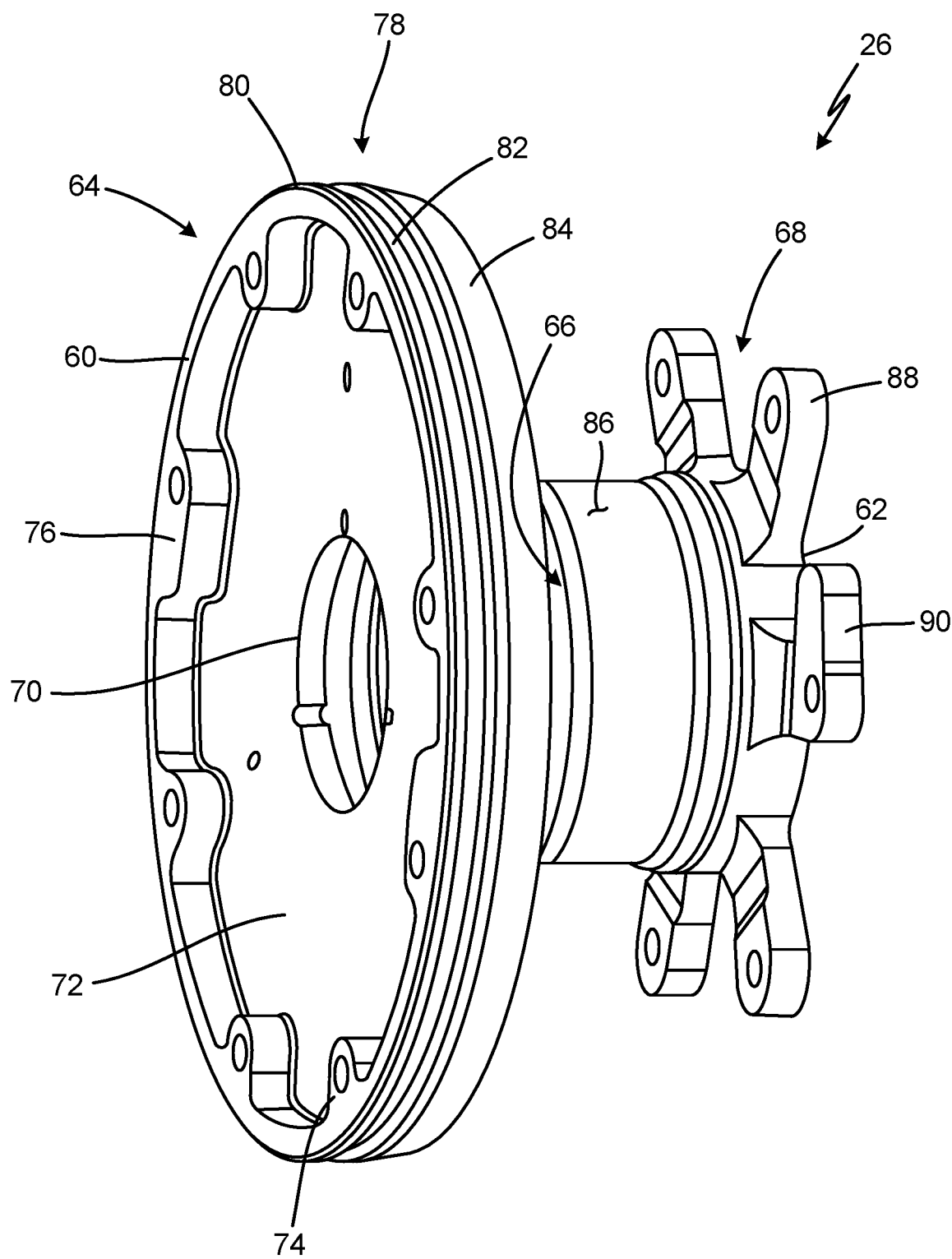
FIG. 2a is an isometric view showing turbine-facing side of a bearing housing for the two-wheel air cycle machine.
Figure 2B:
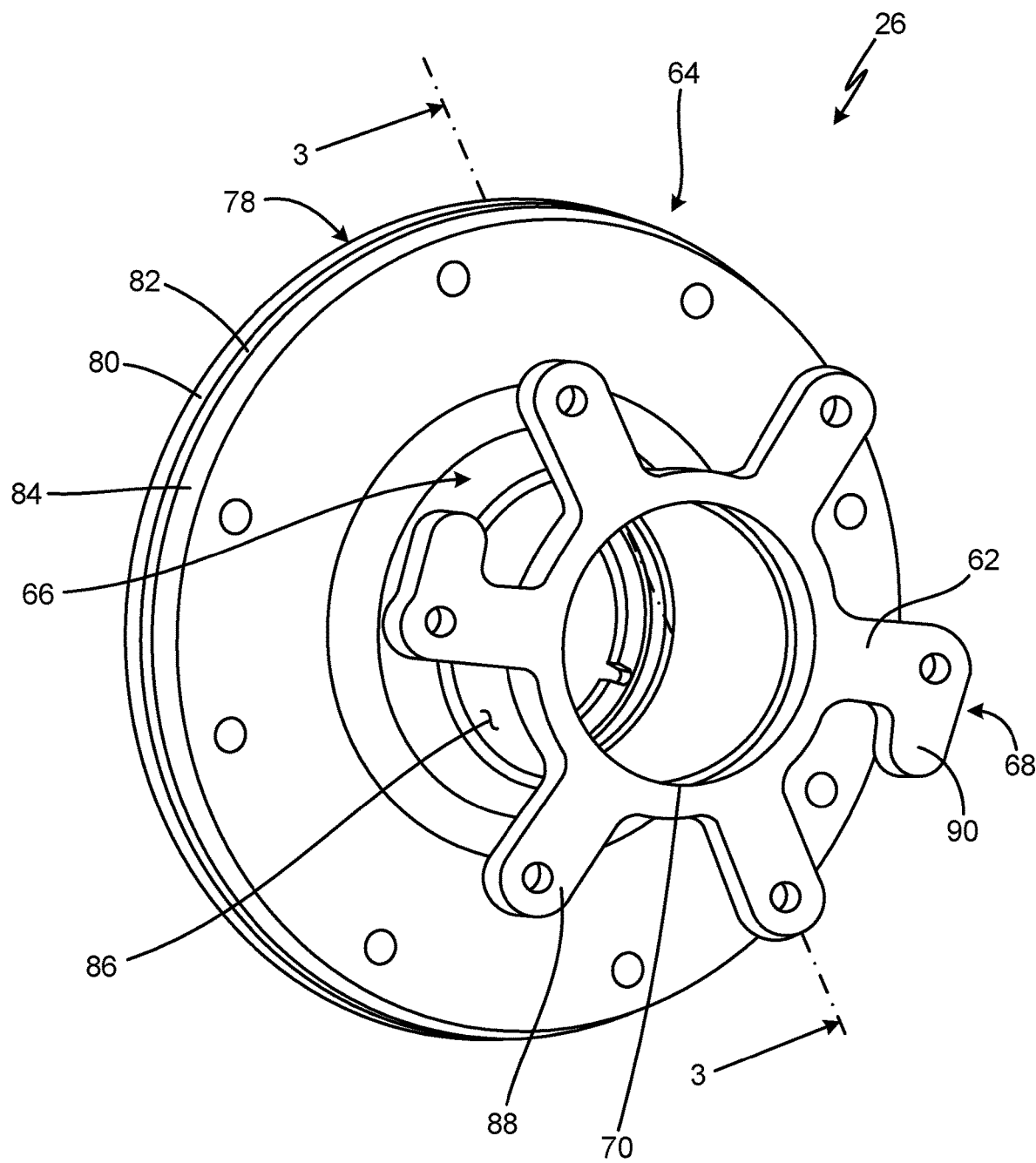
FIG. 2b is an isometric view showing compressor-facing side of the bearing housing for the two-wheel air cycle machine including line 3-3.

FIG. 2a is an isometric view showing turbine-facing side 60 of bearing housing 26 for two-wheel air cycle machine 2. FIG. 2b is an isometric view showing compressor-facing side 62 of bearing housing 26 for two-wheel air cycle machine 2 including line 3-3. FIGS. 2a and 2b will be discussed simultaneously. FIGS. 2a and 2b include bearing housing 26 with turbine-facing side 60 (shown in in FIG. 2a) and compressor-facing side 62. Bearing housing 26 includes first housing portion 64, second housing portion 66, third housing portion 68, and journal bearing bore 70. First housing portion 64 includes thrust bearing support surface 72 (shown in FIG. 2a), tabs 74 (shown in FIG. 2a), positioning pins 76 (shown in FIG. 2a), and edge 78. Edge 78 also includes outer edge portion 80, groove 82, and inner edge portion 84. Third housing portion 68 includes outer surface 86, tabs 88, and positioning pins 90.

Bearing housing 26 is made of a metal, such as aluminum. Turbine-facing side 60 is a first side of bearing housing 26 and compressor-facing side 62 is a second side of bearing housing 26. First housing portion 64 has a first side flush with turbine-facing side 60 and a second side positioned away from the first side. Second housing portion 64 has a first side attached to the second side of first housing portion 64 and a second side positioned away from the first side. Third housing portion 68 has a first side attached to the second side of second housing portion 66 and a second side flush with compressor-facing side 62. Journal bearing bore 70 runs through the center of first housing portion 64, second housing portion 66, and third housing portion 68. The first side of first housing portion 64 includes thrust bearing support surface 72. Thrust bearing support surface 72 is a partially recessed surface into the first side of first housing portion 62. Surrounding thrust bearing support surface 72 are tabs 74 which are not recessed and are flush with turbine-facing side 60. Multiple tabs 74 have positioning pins 76, which are excess non-recessed material also flush with compressor-facing side 60. Edge 78 is a radially outer edge of first housing portion 64 between the first side of first housing portion 64 and the second side of first housing portion 64. Outer edge portion 80 is adjacent to the first side of housing portion 64. Groove 82 is a recessed groove adjacent to outer edge portion 80. Inner edge portion 84 is a surface between groove 82 and the second side of first housing portion 64. Outer surface 86 is a radially outer surface of third housing portion 68. Tabs 88 extend from outer surface 86 on the second side of third housing portion 68 flush with compressor-facing side 62. Positioning pins 90 are added material on a plurality of tabs 88.

First housing portion 64, second housing portion 66, and third housing portion 68 support compressor-side journal bearing 44 (not shown in FIGS. 2a and 2b) and compressor-side thrust bearing 50 (not shown in FIGS. 2a and 2b). Thrust bearing support surface 72 houses compressor-side thrust bearing 44. Tabs 74 create attachment sites to attach bearing housing 26 to turbine housing 28 (not shown in FIGS. 2a and 2b). Positioning pins 76 help correctly position bearing housing 26 radially when attaching bearing housing 26 to turbine housing 28. Edge 78 increases the structural integrity of bearing housing 26 to better support compressor-side journal bearing 44. Groove 82 is a groove that houses a seal to properly seal bearing housing 26 to turbine housing 28 and have room for thermal expansion during operation of two-wheel air cycle machine 2. Outer surface 86 of third housing portion 68 defines a surface for the bearing cooling flow (see FIG. 1) and the rotor thrust balancing flow (see FIG. 1). Tabs 88 attach bearing housing 26 to seal housing 22. Tabs 88 create a secure area for attachment while lowering the weight of bearing housing 26. Positioning pins 88 help correctly position bearing housing 26 radially when attaching bearing housing 26 to seal housing 22. Journal bearing bore 70 holds and supports compressor-side journal bearing 44 (not shown in FIGS. 2a and 2b) securely even in rotor failure conditions.

Bearing housing 26 securely supports tie rod 38, compressor-side journal bearing 44, and compressor-side thrust bearing 50 within two-wheel air cycle machine 2 while maintaining a low weight. Configuration of edge 78 of first housing portion 64 increases the structural integrity of bearing housing 26. Second housing portion 66 and third housing portion 68 also increase structural integrity and stability of bearing housing 26 and allow for support of compressor-side journal bearing 44 in compliance with aircraft safety standards. Bearing housing 26 can also contain broken pieces of tie rod 38 and compressor-side journal bearing 44 in the case of rotor failure because of the configuration of first housing portion 64, second housing portion 66, and third housing portion 68. Outer surface 86 of third housing portion 68 creates a path for the bearing cooling flow (see FIG. 1). Tabs 88 create places to attach bearing housing 26 to seal housing 22 without unnecessary excess weight.

Figure 3:
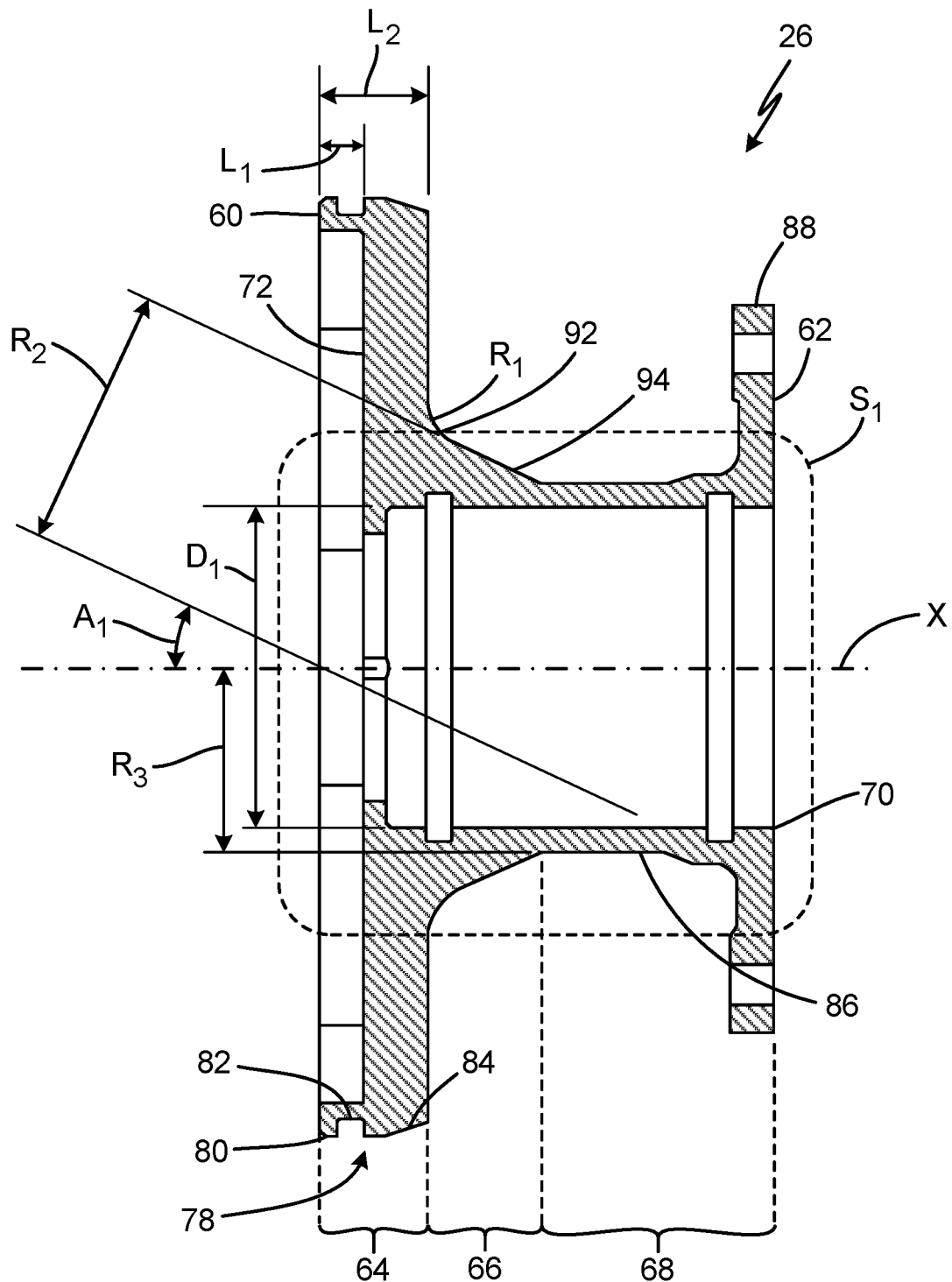
FIG. 3 is a cross section of the bearing housing for the two-wheel air cycle machine including shape $S_1$.

FIG. 3 is a cross section of bearing housing 26 for two-wheel air cycle machine 2 including shape $S_1$. FIG. 3 includes bearing housing 26 with turbine-facing side 60, compressor-facing side 62, first housing portion 64, second housing portion 66, third housing portion 68, and journal bearing bore 70. First housing portion 64 includes thrust bearing support surface 72 and edge 78. Edge 78 includes outer edge portion 80, groove 82, and inner edge portion 84. Third housing portion 66 includes outer surface 86, tabs 88. Second housing portion 66 includes filleted surface 92 and frustoconical surface 94. FIG. 3 also includes central axis x, radius $R_1$, radius $R_2$, radius $R_3$, diameter $D_1$, and angle $A_1$.

Turbine-facing side 60 is a first side of bearing housing 26 and compressor-facing side 62 is a second side of bearing housing 26. First housing portion 64 has a first side flush with turbine-facing side 60 and a second side positioned away from the first side. Second housing portion 64 has a first side attached to the second side of first housing portion 64 and a second side positioned away from the first side. Third housing portion 68 has a first side attached to the second side of second housing portion 66 and a second side positioned axially away from the first side and flush with compressor-facing side 62. Journal bearing bore 70 runs centrally through first housing portion 64, second housing portion 66, and third housing portion 68. Journal bearing bore 70 has a diameter $D_1$ that is between 1.596 inches (4.054 cm) and 1.598 inches (4.059 cm). First housing portion 64, second housing portion 66, third housing portion 68, and journal bearing bore are centered around central axis x.

First housing portion 64 has thrust bearing support surface 72 partially recessed into the first side. First housing portion 64 also includes edge 78 which is a radially outer edge from the first side to the second side of first housing portion 64. Edge 78 includes outer edge portion 80 positioned toward the first side of first housing portion 64, groove 82 adjacent to outer edge portion 78, and inner edge portion 84 positioned toward the second side of first housing portion 64. Outer edge portion 80 and groove 82 have a combined length $L_1$. Length $L_1$ is between 0.215 inches (0.546 cm) and 0.225 (0.572 cm). Edge 78 has a length $L_2$ from the first side of first housing portion 64 to the second side of first housing portion 64. Length $L_2$ is between 0.520 inches (1.321 cm) and 0.560 inches (1.422 cm). A ratio of length $L_1$ to length $L_2$ is between 0.384 and 0.433.

Second housing portion 66 includes filleted surface 92 and frustoconical surface 94. A first side of filleted surface 92 is the first side of second housing portion 66 and connects to the second side of first housing portion 64. A second side of filleted surface 92 connects to a first side of frustoconical wall portion 94. A second side of frustoconical wall portion 94 attaches to a first side of third housing portion 68. Filleted surface 92 has a fillet radius $R_1$. Fillet radius $R_1$ is between 0.230 inches (0.584 cm) and 0.270 inches (0.686 cm). A ratio between journal bearing bore 70 diameter $D_1$ and radius $R_1$ is between 5.911 and 6.948. Frustoconical wall portion 94 is conically positioned at an angle $A_1$ offset from axis x. Angle $A_1$ is between 24.980 degrees and 25.020 degrees. Frustoconical wall portion 94 is a radius $R_2$ from offset angle $A_1$. Radius $R_2$ is between 1.275 inches (3.239 cm) and 1.315 inches (3.340 cm). A ratio between diameter $D_1$ and radius $R_2$ is between 1.214 and 1.253.

Third housing portion 64 includes outer surface 86 and tabs 88. Tabs 88 extend from outer housing surface 86 on the second side of third housing portion 68. Tabs 88 are flush with compressor-facing side 62. Outer surface 86 is a radius $R_3$ away from central axis X. Radius $R_3$ is between 0.895 inches (2.273 cm) and 0.935 inches (2.375 cm). A ratio between journal bearing bore 70 diameter $D_1$ and radius $R_3$ is between 1.707 and 1.785.

The ratio of length $L_1$ to length $L_2$ adequately supports compressor-side journal bearing 44 (not shown in FIG. 3) and compressor-side thrust bearing 50 (not shown in FIG. 3). The ratio of diameter $D_1$ to radius $R_1$ and the ratio of diameter $D_1$ to radius $R_2$ reinforce the second housing portion 66 to support the compressor-side journal bearing 44. The reinforcement provided by filleted surface 92 and frustoconical surface 94 is important for containing pieces of air cycle machine 2 in case of a rotor failure event. Similarly, the ratio of diameter $D_1$ to radius $R_3$ increases support for compressor-side journal bearing 44 and contains broken pieces if there is rotor failure. Outer surface 84 also helps define the bearing cooling flow path (see FIG. 1). Tabs 86 allow bearing housing 26 to attach to seal housing 22 (not shown in FIG. 3) while keeping the weight of bearing housing 26 low.

Figure 4:
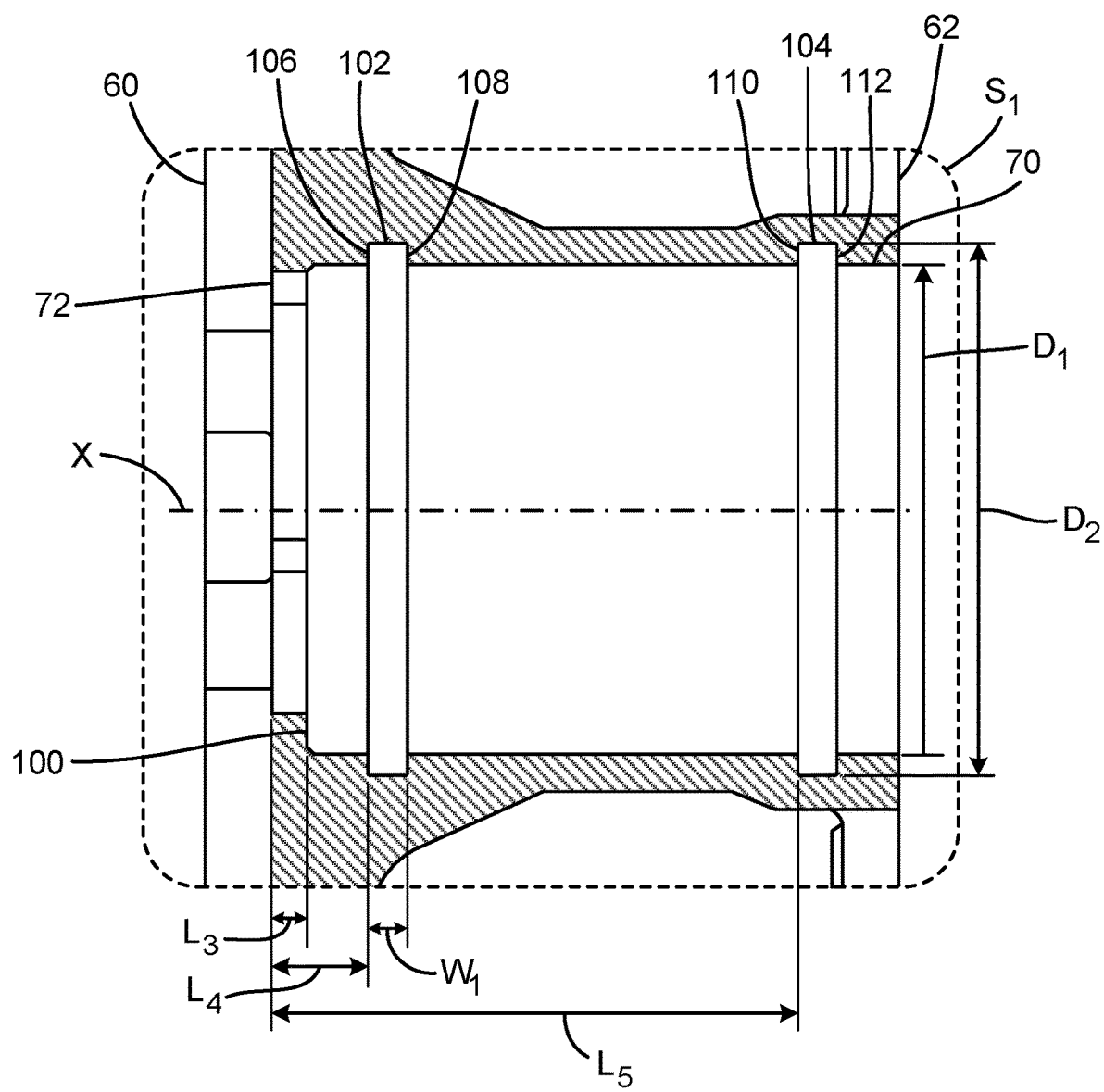
FIG. 4 is a close-up view of shape $S_1$ showing a journal bearing bore in the bearing housing.

FIG. 4 is a close-up view of shape $S_1$ showing journal bearing bore 70 in bearing housing 26. Bearing housing 26 includes turbine-facing side 60, compressor-facing side 62, journal bearing bore 70, and thrust bearing surface 72. Journal bearing bore 70 includes journal bearing support surface 100, first O-seal gland 102, and second O-seal gland 104. First O-seal 102 gland has a first face 106 and a second face 108. Second O-seal gland 104 has a first face 110 and a second face 112. FIG. 4 also includes central axis X, diameter $D_1$, diameter $D_2$, width $W_1$, length $L_3$, length $L_4$, and length $L_5$.

Bearing housing 26 is centered around central axis x and has turbine-facing side 60, a first side of bearing housing 26, positioned axially away from compressor-facing side 62, a second side of bearing housing 26. Journal bearing bore 70 is centered around axis x and within bearing housing 26. Journal bearing bore 70 has a first side positioned toward turbine-facing side 60 and a second side axially away from the first side and flush with compressor-facing side 62. Thrust bearing surface 72 is a recessed surface on turbine-facing side 60. Thrust bearing surface 72 is flush with a first side of journal bearing support surface 100. Journal bearing support surface 100 has a second side flush with the first side of journal bearing bore 70. The diameter of journal bearing support surface 100 is less than diameter $D_1$ of journal bearing bore 70. Journal bearing support surface 100 has a length $L_3$ from the first side to the second side. Length $L_3$ is between 0.123 inches (0.311 cm) and 0.125 inches (0.316 cm).

Journal bearing bore 70 includes first O-seal gland 102 and second O-seal gland 104, which are recessed channels in journal bearing bore 70. First O-seal gland 102 is positioned toward turbine-facing side 60. Second O-seal gland 104 is positioned toward compressor-facing side 62. First side 106 of first O-seal gland 102 faces turbine-facing side 60. Second side 108 of first O-seal gland 102 faces compressor-facing side 62. First side 110 of second O-seal gland 104 faces turbine-facing side 60. Second side 112 of second O-seal gland 104 faces compressor-facing side 62. First O-seal gland 102 and second O-seal gland 104 have a diameter $D_2$ which is between 1.728 inches (4.389 cm) and 1.732 inches (4.399 cm). A ratio of diameter $D_1$ to diameter $D_2$ is between 0.921 and 0.925. First O-seal gland 102 has a width of $W_1$ from first side 106 to second side 108. Second O-seal gland 104 also is the width $W_1$ from first side 110 to second side 112. Width $W_1$ is between 0.129 inches (0.328 cm) and 0.139 inches (0.353 cm). A ratio of width $W_1$ to diameter $D_2$ is between 0.074 and 0.080. First face 106 of first O-seal gland 102 is a length $L_4$ from thrust bearing surface 70. Length $L_4$ is between 0.304 inches (0.772 cm) and 0.306 inches (0.777 cm). A ratio of length $L_3$ to length $L_4$ is between 0.400 and 0.410. First face 110 of second O-seal gland 104 is a length $L_5$ away from thrust bearing surface 70. Length $L_5$ is between 1.709 inches (4.341 cm) and 1.711 inches (4.346 cm). A ratio between length $L_4$ and length $L_5$ is between 0.178 and 0.179.

Journal bearing bore 70 and thrust bearing support surface 72 support compressor-side journal bearing 44 (not shown in FIG. 5) and compressor-side thrust bearing 50 (not shown in FIG. 5), respectively. Journal bearing support surface 100 provides a structure to secure compressor-side journal bearing 44. First O-seal gland 102 and second O-seal gland 104 provide a space for rubber O-seals that also secure compressor-side journal bearing 44 into bearing housing 26.

Thrust bearing support surface 72 allows compressor-side thrust bearing 50 to be centrally located in air cycle machine 2. This allows room between compressor-side thrust bearing 50 and turbine-side thrust bearing 46 (not shown in FIG. 5) for thrust disk 48 (not shown in FIG. 5). Positioning journal bearing support surface 100 a length $L_3$ from thrust bearing support surface 70 creates structural support in bearing housing 26 to adequately support compressor-side journal bearing 44 during operation of air cycle machine 2. First O-seal gland 102 and second O-seal gland 104 have a geometry so the ratio of diameter $D_1$ to diameter $D_2$ and the ratio of width $W_1$ to diameter $D_2$ allow for proper O-seal sizing to fit around compressor-side journal bearing 44 and securely hold compressor-side journal bearing 44 within bearing housing 26. Further, positioning first O-seal gland 102 at the ratio of length $L_3$ to length $L_4$ and positioning second O-ring gland 104 at the ratio of length $L_4$ to length $L_5$ creates adequate spacing between O-seals sitting with the glands to secure compressor-side journal bearing 44 with room for thermal expansion. Journal bearing bore support surface 100, first O-seal gland 102, and second O-seal gland 104 are positioned within bearing housing 26 and in journal bearing bore 70 to meet the requisite operational and containment regulations.

Discussion of Possible Embodiments

The following are non-exclusive descriptions of possible embodiments of the present invention.

A bearing housing for a two-wheel air cycle machine includes a first housing portion, a second housing portion, a third housing portion, and a journal bearing bore. The first housing portion, second housing portion, third housing portion, and journal bearing bore are centered around a central axis. The first housing portion includes a first side and a second side positioned axially away from the first side.

The second housing portion includes a first side and a second side positioned axially away from the first side. The first side of the second housing portion is adjacent to the second side of the first housing portion. The third housing portion includes a first side and a second side positioned axially away from the first side. The first side of the third housing portion is adjacent to the second side of the second housing portion. The journal bearing bore has a first diameter.

The bearing housing of the preceding paragraph can optionally include, additionally and/or alternatively, any one or more of the following features, configurations and/or additional components:

Wherein the first housing portion further includes an edge located on an axially outer surface between the first side and the second side of the first housing portion, a thrust bearing support surface recessed into the first side of the first housing portion, and a journal bearing support surface recessed into the thrust bearing support surface; the edge includes an outer edge portion toward the first side of the first housing portion, an inner edge portion toward the second side of the first housing portion, and a groove between the outer edge portion and the inner edge portion.

Wherein the outer edge and the groove have a combined length of a first length and the edge has a second length, wherein a ratio of the first length and the second length is between 0.384 and 0.433.

Wherein the journal bearing bore includes a first end flush with the journal bearing support surface, a second end flush with the second end of the third housing portion, a first O-seal gland with a first edge facing the first Wherein the first O-seal gland and the second O-seal gland each have a second diameter, and wherein a ratio of the first diameter to the second diameter is between 0.921 and 0.925.

Wherein the first O-seal gland and the second O-seal gland each have a width from the first side to the second side, respectively; wherein a ratio of the width to the second diameter is between 0.074 and 0.080.

Wherein the journal bearing support surface is a third length away from the thrust bearing support surface, the first side of the first O-seal gland is a fourth length away from the thrust bearing support surface, and the first side of the second O-seal gland is a fifth length away from the thrust bearing support surface; wherein a ratio of the third length to the fourth length is between 0.400 and 0.410 and a ratio of the fourth length to the fifth length is between 0.178 and 0.179.

Wherein the second housing portion further includes a filleted surface connected to the second side of the first housing portion and a frustoconical surface between the filleted surface and the first side of the third housing portion; wherein the filleted wall portion has a fillet radius of a first radius; wherein a ratio of the first diameter to the first radius is between 5.911 and 6.948.

Wherein the frustoconical wall section is at an offset angle between 24.980 degrees and 25.020 degrees and is positioned a second radius from the offset angle, and wherein a ratio of the first diameter to the second radius is between 1.214 and 1.253.

Wherein the third housing portion includes an outer wall portion positioned a third radius from the central axis, tabs extending from the outer wall at the second side of the third housing portion, and positioning pins extending from at least two of the mounting tabs; wherein a ratio of the first diameter to the third radius is between 1.707 and 1.785.

A two-wheel air cycle machine includes a turbine assembly including a turbine rotor, a compressor assembly including a compressor rotor, a tie rod connecting the turbine rotor and the compressor rotor, and thrust bearings positioned between the compressor assembly and the turbine assembly. The turbine assembly includes a turbine rotor, a turbine housing, and a turbine-end journal bearing within the turbine housing. The compressor assembly further includes a compressor inlet housing, a compressor outlet housing connected to the compressor inlet housing, a compressor seal housing within the compressor outlet housing, a bearing housing within the compressor outlet housing and attached at a first side to the compressor seal housing and attached at a second side to the turbine housing, and a compressor-end journal bearing within the bearing housing. The bearing housing includes a first housing portion, a second housing portion, a third housing portion, and a journal bearing bore. The first housing portion, second housing portion, third housing portion, and journal bearing bore are centered around a central axis. The first housing portion includes a first side and a second side positioned axially away from the first side. The second housing portion includes a first side and a second side positioned axially away from the first side. The first side of the second housing portion is adjacent to the second side of the first housing portion. The third housing portion includes a first side and a second side positioned axially away from the first side. The first side of the third housing portion is adjacent to the second side of the second housing portion. The journal bearing bore has a first diameter. The tie rod is coaxial with the central axis and supported by the turbine-end journal bearing and the compressor-end journal bearing. The thrust bearings are supported by the turbine housing and the bearing housing.

The bearing housing of the preceding paragraph can optionally include, additionally and/or alternatively, any one or more of the following features, configurations and/or additional components:

Wherein the first housing portion further includes an edge located on an axially outer surface between the first side and the second side of the first housing portion, a thrust bearing support surface recessed into the first side of the first housing portion, and a journal bearing support surface recessed into the thrust bearing support surface; the edge includes an outer edge portion toward the first side of the first housing portion, an inner edge portion toward the second side of the first housing portion, and a groove between the outer edge portion and the inner edge portion.

Wherein the outer edge and the groove have a combined length of a first length and the edge has a second length, and wherein a ratio of the first length and the second length is between 0.384 and 0.433.

Wherein the journal bearing bore includes a first end flush with the journal bearing support surface, a second end flush with the second end of the third housing portion, a first O-seal gland with a first edge facing the first Wherein the first O-seal gland and the second O-seal gland each have a second diameter, and wherein a ratio of the first diameter to the second diameter is between 0.921 and 0.925.

Wherein the first O-seal gland and the second O-seal gland each have a width from the first side to the second side, respectively; wherein a ratio of the width to the second diameter is between 0.074 and 0.080.

Wherein the journal bearing support surface is a third length away from the thrust bearing support surface, the first side of the first O-seal gland is a fourth length away from the thrust bearing support surface, and the first side of the second O-seal gland is a fifth length away from the thrust bearing support surface; wherein a ratio of the third length to the fourth length is between 0.400 and 0.410 and a ratio of the fourth length to the fifth length is between 0.178 and 0.179.

Wherein the second housing portion further includes a filleted surface connected to the second side of the first housing portion and a frustoconical surface between the filleted surface and the first side of the third housing portion; wherein the filleted wall portion has a fillet radius of a first radius; wherein a ratio of the first diameter to the first radius is between 5.911 and 6.948.

Wherein the frustoconical wall section is at an offset angle between 24.980 degrees and 25.020 degrees and is positioned a second radius from the offset angle, and wherein a ratio of the first diameter to the second radius is between 1.214 and 1.253.

Wherein the third housing portion includes an outer wall portion positioned a third radius from the central axis, tabs extending from the outer wall at the second side of the third housing portion, and positioning pins extending from at least two of the mounting tabs; wherein a ratio of the first diameter to the third radius is between 1.707 and 1.785.

The invention claimed is:

1. A bearing housing for a two-wheel air cycle machine, the bearing housing comprising:
 a first housing portion centered around an axis with a first side and a second side positioned axially away from the first side;
 a second housing portion centered around the axis with a first side and a second side positioned axially away from the first side, and wherein the first side of the second housing portion is attached to the second side of the first housing portion, the second housing portion comprising:
  a filleted surface with a first side connected to the second side of the first housing portion and a second side; and
  a frustoconical surface with a first side connected to the second side of the filleted surface and a second side;
 a third housing portion centered around the axis with a first side and a second side positioned axially away from the first side, wherein the first side of the third housing portion is attached to the second side of the frustoconical surface of the second housing portion; and
 a journal bearing bore axially centered within the bearing housing and having a first diameter.

2. The bearing housing of claim 1, wherein the first housing portion further comprises:
 an edge located on an axially outer surface between the first side and the second side of the first housing portion, wherein the edge comprises:
  an outer edge portion toward the first side of the first housing portion;
  an inner edge portion toward the second side of the first housing portion; and
  a groove between the outer edge portion and the inner edge portion;
 a thrust bearing support surface recessed into the first side of the first housing portion; and
 a journal bearing support surface recessed into the thrust bearing support surface.

3. The bearing housing of claim 2, wherein the outer edge and the groove have a combined length of a first length and the edge has a second length, and wherein a ratio of the first length and the second length is between 0.384 and 0.433.

4. The bearing housing of claim 2, wherein the journal bearing bore comprises:
 a first end flush with the journal bearing support surface;
 a second end flush with the second end of the third housing portion;
 a first O-seal gland with a first side facing the first end of the journal bearing bore and a second side facing the second end of the journal bearing bore; and
 a second O-seal gland with a first side facing the first end of the journal bearing bore and a second side facing the second end of the journal bearing bore.

5. The bearing housing of claim 4, wherein the first O-seal gland and the second O-seal gland each have a second diameter, and wherein a ratio of the first diameter to the second diameter is between 0.921 and 0.925.

6. The bearing housing of claim 5, wherein the first O-seal gland and the second O-seal gland each have a width from the first side to the second side, respectively, and wherein a ratio of the width to the second diameter is between 0.074 and 0.080.

7. The bearing housing of claim 4, wherein the journal bearing support surface is a third length away from the thrust bearing support surface, the first side of the first O-seal gland is a fourth length away from the thrust bearing support surface, and the first side of the second O-seal gland is a fifth length away from the thrust bearing support surface, and wherein a ratio of the third length to the fourth length is between 0.400 and 0.410 and a ratio of the fourth length to the fifth length is between 0.178 and 0.179.

8. The bearing housing of claim 1,
 wherein the filleted wall portion has a fillet radius of a first radius, and
 wherein a ratio of the first diameter to the first radius is between 5.911 and 6.948.

9. The bearing housing of claim 8, wherein the frustoconical wall section is at an offset angle between 24.980 degrees and 25.020 degrees and is positioned a second radius from the offset angle, and wherein a ratio of the first diameter to the second radius is between 1.214 and 1.253.

10. The bearing housing of claim 1, wherein the third housing portion comprises:
 an outer wall positioned a third radius away from the central axis wherein a ratio of the first diameter to the third radius is between 1.707 and 1.785;
 tabs extending from the outer wall at the second side of the third housing portion; and
 positioning pins extending from at least two of the mounting tabs.

11. A two-wheel air cycle machine for an aircraft, the two-wheel air cycle machine comprising:
 a turbine assembly comprising:
  a turbine rotor;
  a turbine housing; and
  a turbine-end journal bearing within the turbine housing;
 a compressor assembly comprising:
  a compressor inlet housing;
  a compressor outlet housing connected to the compressor inlet housing;
  a compressor seal housing within the compressor outlet housing;
  a bearing housing within the compressor outlet housing and attached at a first side to the compressor seal housing and attached at a second side to the turbine housing, the bearing housing comprising:
   a first housing portion centered around an axis with a first side and a second side positioned axially away from the first side;

a second housing portion centered around the axis with a first side and a second side positioned axially away from the first side, and wherein the first side of the second housing portion is adjacent to the second side of the first housing portion;
a third housing portion centered around the axis with a first side and a second side positioned axially away from the first side, wherein the first side of the second housing portion is adjacent to the second side of the second housing portion; and
a journal bearing bore axially centered within the bearing housing having a first diameter; and
a compressor-end journal bearing within the bearing housing;
a tie rod coaxial with the central axis and connects the turbine rotor and the compressor rotor and supported by the turbine-end journal bearing and the compressor-end journal bearing; and
thrust bearings centrally positioned between the turbine assembly and the compressor assembly supported by the turbine housing and the bearing housing.

12. The two-wheel air cycle machine of claim 11, wherein the first housing portion of the bearing housing further comprises:
an edge located on an axially outer surface between the first side and the second side of the first housing portion, wherein the edge comprises:
an outer edge portion toward the first side of the first housing portion;
an inner edge portion toward the second side of the first housing portion; and
a groove between the outer edge portion and the inner edge portion;
a thrust bearing support surface recessed into the first side of the first housing portion; and
a journal bearing support surface recessed into the thrust bearing support surface.

13. The two-wheel air cycle machine of claim 12, wherein the outer edge and the groove of the bearing housing have a combined length of a first length and the edge has a second length, and wherein a ratio of the first length and the second length is between 0.384 and 0.433.

14. The two-wheel air cycle machine of claim 12, wherein the journal bearing bore comprises:
a first end flush with the journal bearing support surface;
a second end flush with the second end of the third housing portion;
a first O-seal gland with a first side facing the first end of the journal bearing bore and a second side facing the second end of the journal bearing bore; and
a second O-seal gland with a first side facing the first end of the journal bearing bore and a second side facing the second end of the journal bearing bore.

15. The two-wheel air cycle machine of claim 14, wherein the first O-seal gland and the second O-seal gland each have a second diameter, and wherein a ratio of the first diameter to the second diameter is between 0.921 and 0.925.

16. The two-wheel air cycle machine of claim 15, wherein the first O-seal gland and the second O-seal gland each have a width from the first side to the second side, respectively, and wherein a ratio of the width to the second diameter is between 0.074 and 0.080.

17. The two-wheel air cycle machine of claim 14, wherein the journal bearing support surface is a third length away from the thrust bearing support surface, the first side of the first O-seal gland is a fourth length away from the thrust bearing support surface, and the first side of the second O-seal gland is a fifth length away from the thrust bearing support surface, and wherein a ratio of the third length to the fourth length is between 0.400 and 0.410 and a ratio of the fourth length to the fifth length is between 0.178 and 0.179.

18. The two-wheel air cycle machine of claim 11, wherein the second housing portion of the bearing housing comprises:
a filleted surface connected to the second side of the first housing portion; and
a frustoconical surface between the filleted surface and the first side of the third housing portion;
wherein the filleted wall portion has a fillet radius of a first radius, and
wherein a ratio of the first diameter to the first radius is between 5.911 and 6.948.

19. The two-wheel air cycle machine of claim 18, wherein the frustoconical wall section is at an offset angle between 24.980 degrees and 25.020 degrees and h is positioned a second radius from the offset angle, and wherein a ratio of the first diameter to the second radius is between 1.214 and 1.253.

20. The two-wheel air cycle machine of claim 11, wherein the third housing portion of the bearing housing comprises:
an outer wall positioned a third radius away from the central axis, wherein a ratio of the first diameter to the third radius is between 1.707 and 1.785;
tabs extending from the outer wall at the second side of the third housing portion; and
positioning pins extending from at least two of the mounting tabs.

* * * * *